United States Patent
Billard et al.

(10) Patent No.: US 6,554,421 B1
(45) Date of Patent: Apr. 29, 2003

(54) NON-CORRECTING LENS BLANK, AND METHOD FOR MAKING SAME

(75) Inventors: Etienne Billard, Saint-Claude (FR); Alain Ravier, Saint-Claude (FR)

(73) Assignee: Christian Dalloz Sunoptics, Saint-Claude (FR)

(*) Notice: Subject to any disclaimer, the term of this patent is extended or adjusted under 35 U.S.C. 154(b) by 0 days.

(21) Appl. No.: 09/856,960

(22) PCT Filed: Dec. 3, 1999

(86) PCT No.: PCT/FR99/03011

§ 371 (c)(1),
(2), (4) Date: May 29, 2001

(87) PCT Pub. No.: WO00/33123

PCT Pub. Date: Jun. 8, 2000

(30) Foreign Application Priority Data

Dec. 3, 1999 (FR) ............................................. 98 15453

(51) Int. Cl.7 ................................................. G02C 7/10
(52) U.S. Cl. ............................ 351/41; 351/44; 351/177
(58) Field of Search ............................ 351/41, 44, 49, 351/159, 163, 177

(56) References Cited

U.S. PATENT DOCUMENTS

| | | | |
|---|---|---|---|
| 4,090,830 A | 5/1978 | Laliberte | 425/117 |
| 5,412,505 A | 5/1995 | van Ligten et al. | 359/483 |
| 5,434,707 A * | 7/1995 | Dalzell et al. | 359/485 |
| 5,702,813 A | 12/1997 | Murata et al. | 428/332 |
| 6,220,703 B1 * | 4/2001 | Evans et al. | 351/163 |

FOREIGN PATENT DOCUMENTS

| | | |
|---|---|---|
| FR | A 2 118 305 | 7/1972 |
| FR | A1 2 740 231 | 4/1997 |
| WO | WO 96/27496 | 9/1996 |
| WO | WO 97/38344 | 10/1997 |

* cited by examiner

*Primary Examiner*—Huy Mai
(74) *Attorney, Agent, or Firm*—Oliff & Berridge, PLC

(57) ABSTRACT

A nonconnecting lens blank and method provide an integrated optical function insert and allow for ease in trimming by the ability to visually orient the geometric alignment of the optical function insert. The nonconnecting lens blank has an inner concave face (2c) and an outer convex face (2b) delimited by a peripheral border (2a). A matrix (4) of transparent material transmits light from the outer face towards the inner face. An insert (6) integrating the optical function is placed in one of the faces of the matrix. The matrix may include a housing (5) in which the insert (6) is fitted. The insert (6) preferably has two truncated concentric circular edges (5a1, 5a2) separated by two straight parallel edges (5a3, 5a4). The optical function may be polarization with the plane of polarization aligned relative to the straight edges.

25 Claims, 4 Drawing Sheets

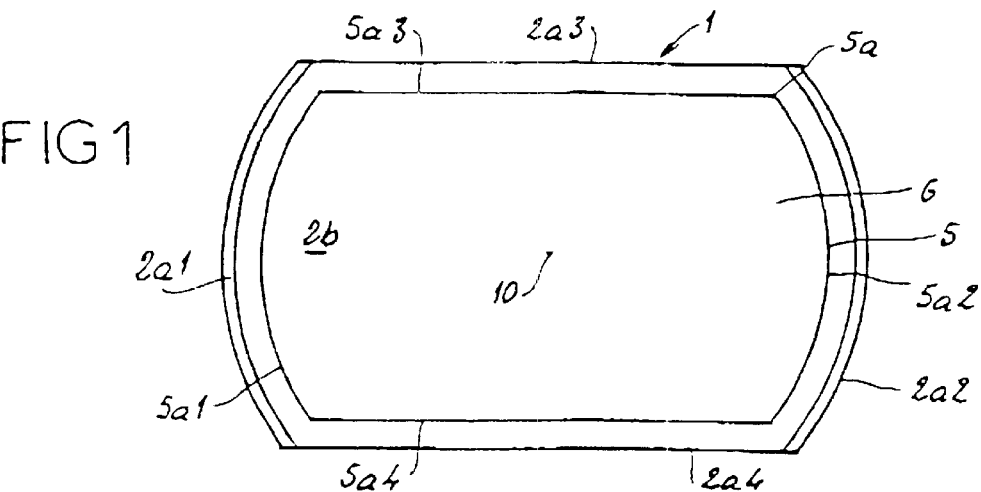
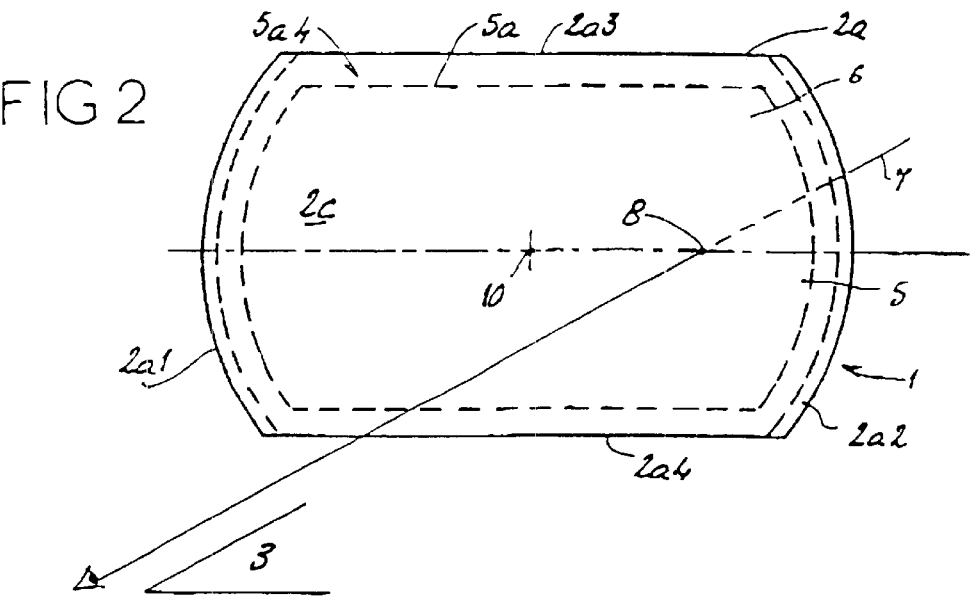
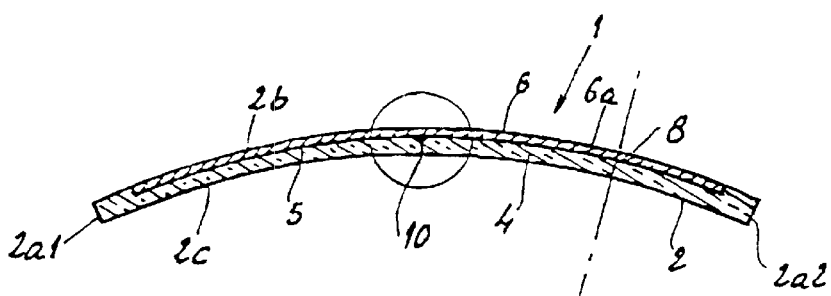
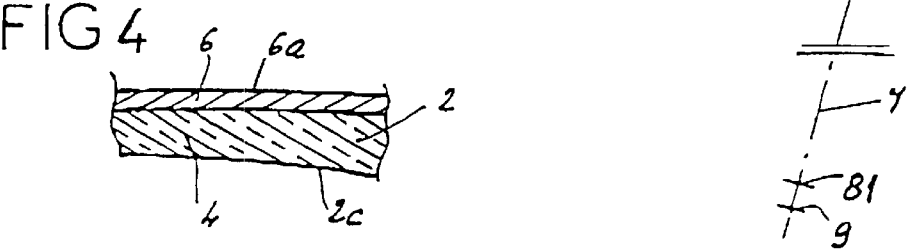

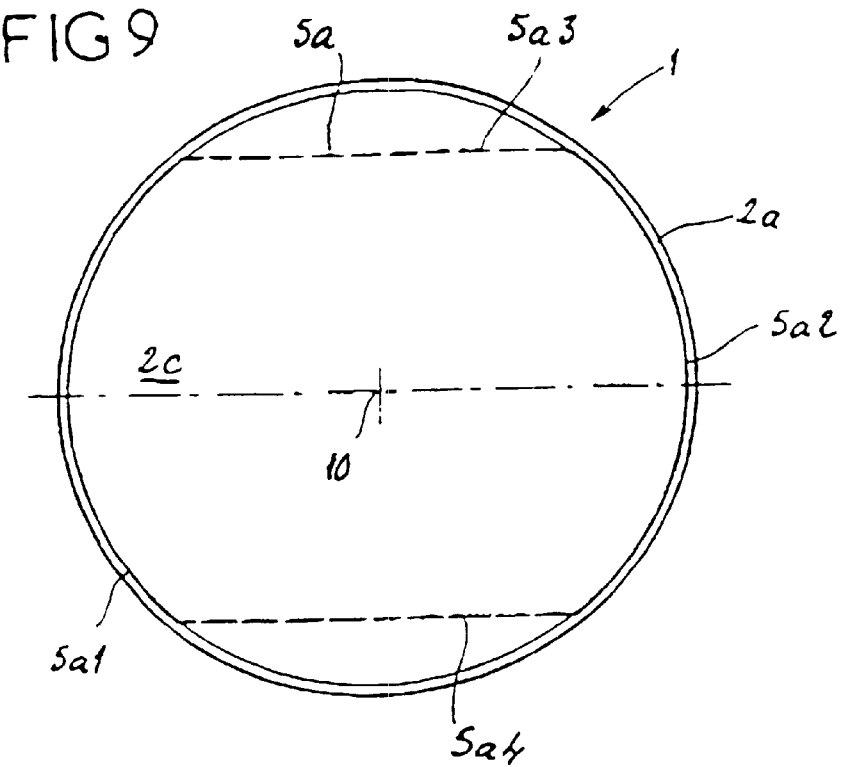
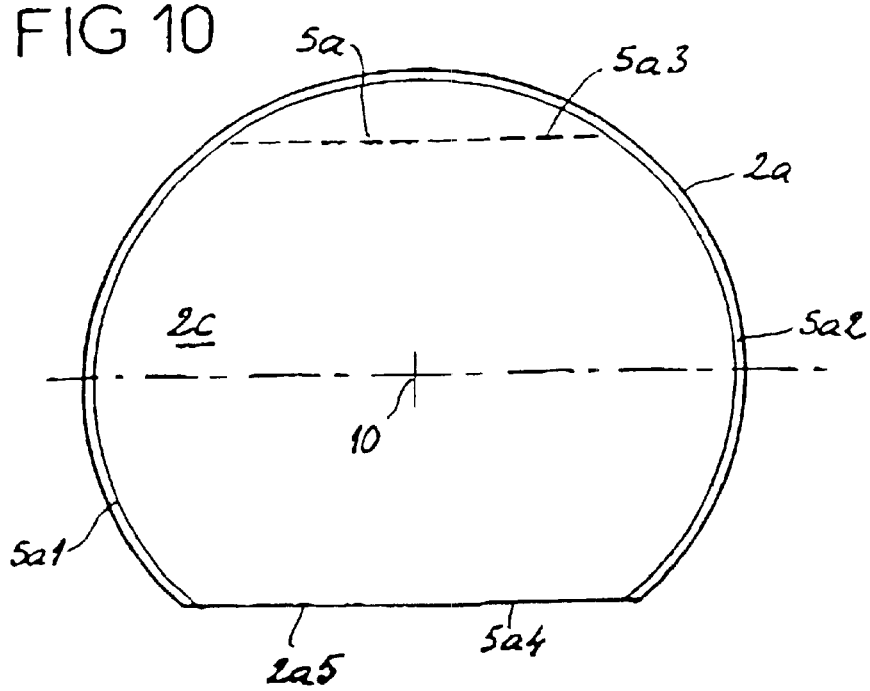

NON-CORRECTING LENS BLANK, AND METHOD FOR MAKING SAME

The present invention relates to noncorrecting lens blanks, which make it possible to obtain noncorrecting lenses by trimming, and the shape and dimensions of which are matched for mounting in or on a suitable frame of a pair of glasses.

The invention also relates to pairs of glasses, intended for solar or industrial protection, comprising two noncorrecting lenses, each one capable of being obtained by trimming a blank as defined above, these lenses being mounted or supported in or by a suitable frame.

More specifically, the invention relates to noncorrecting lens blanks which are polarizing or which have another optical function and to glasses obtained from such blanks, and consequently, comprising two noncorrecting lenses which are also polarizing or which have this other function. The latter is, for example, the photochromic function which alters the intensity of the color of the glass according to the intensity of the light received. It is possible also to envision having an infrared filter, or any other function.

At present, in order to obtain a polarizing noncorrecting lens blank, the starting material used is a composite sheet comprising a filtering film made of a polarizing material, inserted between two layers of a light-transmitting transparent material, preferably made of a thermoplastic, for example a polycarbonate. Next, a strip delimited by a peripheral border is flat cut in this composite sheet. Then this strip is thermoformed in order to obtain a blank, according to any predetermined radius of curvature, and delimited between one outer convex face and an opposite inner and concave face. On the basis of the preferred plane of polarization of the filtering film, and given the angular orientation of said film with respect to the two layers of the transparent material, the blank acquires a preferred plane of polarization. The latter preferably remains substantially parallel to the optical axis of the lens which will then be obtained by trimming said blank.

The blanks and lenses obtained from composite thermoformed sheets have mediocre, even inadequate, optical characteristics, in particular for large curvatures (base 6 and above). This is because the power and prism values of the lens obtained by trimming such a blank do not comply with current standards. This results especially from the fact that the thermoforming operation does not allow control of the relative position of the anterior and posterior diopters, and therefore the position of the optical center of the blank.

Moreover, document FR 2 740 231 describes and proposes a noncorrecting lens blank having good optical properties, in particular power and prism properties, including for glasses of strong curvature corresponding to a mean radius of curvature at the most equal to about 90 mm. This blank comprises a transparent strip having, on the one hand, a geometric axis passing through said strip and defining a geometric center, and, on the other hand, an optical axis defining an optical center. In addition, the strip, seen in elevation, has a generally noncircular perimeter, and the optical axis and the geometric axis and consequently the optical and geometric centers, are distinct and offset at an angle and by a predetermined distance one from the other.

The subject of the present invention is a noncorrecting lens blank integrating any optical function such as, for example, polarization, making it possible to obtain substantially the same optical characteristics as those obtained according to document FR 2 740 231, notwithstanding the presence of a film in the blank allowing the latter to integrate a function such as polarization, infrared filtration or any other known function that can be applied to a lens.

According to the present invention, the blank comprises a composite strip, delimited by a peripheral border and between an outer convex face and an opposite inner concave face, said composite strip consisting of at least one transparent material, transmitting light from the outer face to the inner face, and said composite strip incorporating a film integrating the optical function. This composite strip has, in a first embodiment according to the invention, the following structure and arrangement:

firstly, the strip comprises a matrix of transparent material determining the inner face of the lens from the inner side; and in this matrix from the outer side, a convex housing is reserved, whose flat surface occupies the majority of the surface of the composite strip; and a piece of film, matched in shape and in dimensions to the convex housing, occupies the latter.

This composite strip has, in a second embodiment according to the invention, the following structure and arrangement:

firstly, the strip comprises a matrix of transparent material, determining the outer face of the lens from the outer side; and in this matrix, from the inner side, is reserved a concave housing whose flat surface occupies the majority of the surface of the composite strip; and a piece of film, matched in shape and in dimensions to the concave housing, occupies the latter.

A blank obtained according to the invention makes it possible to control, especially in terms of tolerance and positioning, the proper orientation of this blank during its trimming, and consequently the quality of the lens thus obtained.

The housing is, for example, a convex housing placed on the outer face of the matrix. By virtue of the arrangement of the film on the outer side of the blank, the outer face of the film corresponds mainly to the outer convex face of the blank, or subsequently of the lens. In addition, the stresses generated in the injected transparent material, which usually generate an unwanted polarization, are virtually imperceptible to the eye of the user of the glasses.

Advantageously, the piece of film has a constant thickness.

By way of first example, the peripheral border comprises two truncated concentric circular edges, separated by two straight parallel edges, for example of identical length, and the perimeter of the housing has substantially the same profile as that of the peripheral border, and is fitted in a homothetic manner in the latter.

By way of second example, the peripheral border is at least predominantly circular, and the perimeter of the housing comprises two truncated concentric circular edges, separated by two parallel straight edges, for example of identical length. In this example, the peripheral border comprises, for example, a predominant circular part and a straight part, which is coincident with a straight edge of the housing.

In one embodiment, the inner and outer faces each have, at least in part, a symmetry of revolution about the same axis, called the optical axis, determining, if required, an optical center on the two outer and inner faces of the composite strip. In this case, the peripheral border has, for example, at least in part, a profile of revolution about a geometric center, placed at a distance and distinct from the optical axis.

The outer face of the composite strip is advantageously coated by at least one layer of a material chosen from the group comprising scratch-resistant materials, filtering materials and colored materials.

The film integrating the optical function may be a filtering film of a polarizing material and the angular orientation of the piece of filtering film in and with respect to the matrix of transparent material, about a normal axis passing through them, is then preferably chosen in order to give the blank a preferred plane of polarization, substantially parallel to a transverse plane intersecting it.

According to the invention, the preferred plane of polarization of the lense is chosen in order to exhibit any predetermined angular orientation (substantially perpendicular, parallel or other), with reference to an indicator or indicators usually present on the blank, in particular taking account of the interface existing between polarizing and transparent materials, or with reference to an indicator or indicators recorded on the blank, for example hollow or relief marks, making it possible to define one or more reference axes at the time of trimming.

By "substantially parallel or perpendicular", the way in which the curvature of the blank, and subsequently of the lens, considered in a vertical or horizontal insertion plane (with respect to the lens in position on the user's head, via glasses) deviates the orientation of the plane of polarization, going from the edge toward the center of the blank or of the lens, is taken into consideration.

A blank with a piece of polarizing filtering film, obtained according to the invention, makes it possible to control the angular positioning of the preferred plane of polarization of the blank, especially in terms of tolerance, and then the lens obtained by trimming this blank.

For the first example above, that is to say when the peripheral border comprises two truncated concentric circular edges, separated by two straight parallel edges, for example of identical length, and when the perimeter of the convex housing has substantially the same profile as that of the peripheral border, and is fitted in a homothetic manner in the latter and when the piece of film is a piece of polarizing filtering film, then the piece of filtering film is advantageously cut in the polarizing film, so that the preferred plane of polarization is substantially parallel or perpendicular to each straight parallel edge of said piece, in view of which each straight parallel edge of the blank is substantially parallel or perpendicular to the preferred plane of polarization of the latter.

For the second example above, that is to say when the peripheral border is at least for the most part circular, and the perimeter of the convex housing comprises two truncated concentric circular edges separated by two straight parallel edges, for example of identical length, and when the piece of film is a piece of polarizing filtering film, then the piece of filtering film is advantageously cut in band shape in the polarizing film, such that the preferred plane of polarization is substantially parallel or perpendicular to each straight parallel edge of said piece, in view of which at least one straight line of separation between the matrix of the transparent material and the piece of filtering material is substantially parallel or perpendicular to the preferred plane of polarization of the blank.

These arrangements allow an immediate visualization of the plane of polarization of the blank, which allows the glasses manufacturers to trim said blank in order to keep the plane of polarization of the lens substantially parallel or perpendicular to the visual axis of the glasses in position on the user's head.

When each of the inner and outer faces have, at least in part, a symmetry of revolution about the same axis, called the optical axis, determining an optical center on the outer and inner faces of the composite strip, if required, the optical axis is, for example, substantially parallel or perpendicular to the preferred plane of polarization of said blank for polarizing lenses. The geometric shape of the outer face and/or of the inner face of the composite strip, can also be determined such that in a plane of section substantially parallel or perpendicular to the preferred plane of polarization, the thickness of the composite strip decreases continually when moving away from the optical axis toward the outside. In the latter case, the geometric shape of the outer face and the geometric shape of the inner face correspond, for example, respectively to two spheres with centers spaced out along the optical axis.

When the peripheral border has, for example, at least in part, a profile of revolution about a geometric centre, placed at a distance and distinct from the optical axis, the optical axis and the geometric center advantageously determine a plane substantially parallel or perpendicular to the preferred plane of polarization of said blank for polarizing lenses.

The invention also relates to a pair of glasses comprising a frame and two noncorrecting lenses integrating an optical function such as, for example, polarization, supported by said frame, each lens comprising a composite strip delimited between an outer convex face and an opposite inner concave face, said composite strip consisting of at least one transparent material transmitting light from the outer face to the inner face, and said composite strip incorporating a film integrating the optical function. According to the invention, each lens comprises, from the inside toward the outside or conversely, a first thickness of transparent material, determining from the inner, outer side, respectively, said inner, outer face, respectively, and directly in contact with the first thickness, a second thickness of film, determining from the outer, inner side, respectively, said outer, inner face, respectively, of the lens.

When each lens of the pair of glasses is a polarizing lens, each lens is, for example, oriented at an angle with respect to the frame, about a normal axis passing through it, such that its preferred plane of polarization is substantially parallel or perpendicular to the horizontal plane of the pair of glasses, passing through the visual axis of the glasses in position on the user's head.

The transparent material of a blank according to the invention can be obtained, for example by injection molding. The invention thus also relates to a mold for injecting the transparent material, consisting of a thermoplastic or thermosetting synthetic material, in order to obtain a blank as described above, said mold comprising two complementary parts which can be moved one with respect to the other, and which, once assembled one on the other, determine a gap whose volume and shape determine those of the strip; the part of the mold determining the outer face of the strip comprises means for positioning the convex piece of the film. Such a mold will especially be used for polarizing blanks.

A blank according to the invention can also be obtained by a production process comprising a step of overmolding the piece of film by extrusion. In this case, the pieces obtained after extrusion can be cut and thermoformed.

Another process of production means that the matrix of transparent material and the piece integrating the function are produced separately and in [sic] that these two components are subsequently adhesively bonded.

All these solutions make it possible to obtain a good optical quality, complying with the Gullstrand law.

The present invention is now described with reference to the appended drawings, in which:

FIGS. 1 and 2 show a blank according to the present invention, viewed respectively from the outer side and from the inner side where the eye of the user of the pair of glasses is then located, incorporating a lens obtained by trimming the blank according to FIGS. 1 and 2;

FIG. 3 shows a view in cross section of the blank according to FIGS. 1 and 2, the plane of the section being horizontal with respect to the normal position of the aforementioned pair of glasses on the user's head, and passing through the optical center of the blank;

FIG. 4 shows, on an enlarged scale, a detail of FIG. 3;

FIGS. 9 and 10 show, in a manner identical to the representation of FIG. 2, two other embodiments of the present invention.

FIGS. 1 to 4 show a polarizing noncorrecting lens blank according to the present invention, which corresponds, after trimming, to a left lens of a pair of glasses as shown in FIG. 5.

Figure 5:
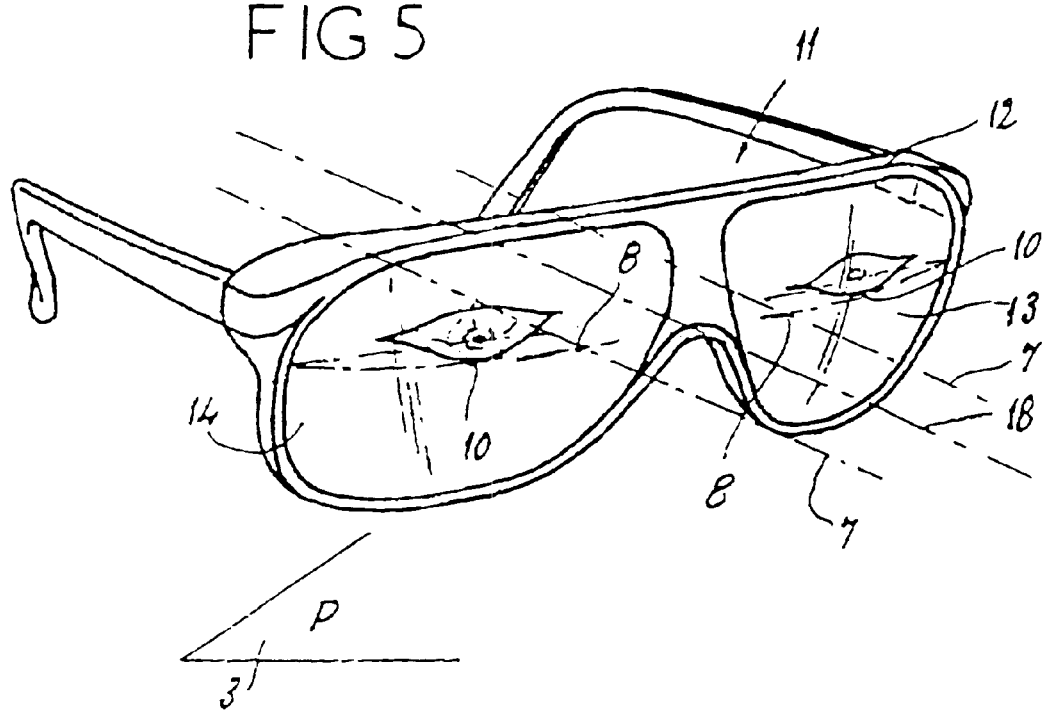
FIG. 5 shows a pair of glasses comprising two lenses, each obtained by trimming a blank according to FIGS. 1 to 4.

Generally, this blank 1 comprises a composite strip 2, having a curved or convex shape. This strip is delimited by a peripheral border 2a, and between an outer convex face 2b and an opposite inner and concave face 2c. Mainly, this composite strip 2 consists of a transparent material, for example polycarbonate, transmitting light from the outer face 2b to the inner face 2c of the strip. In addition, this strip incorporates a filtering film 6 of a polarizing material, which gives the blank a preferred plane of polarization 3.

The composite strip 2 comprises a matrix 4 of transparent material, completely determining from the inner side the inner face 2c of the blank, and in which is reserved, from the outer side, a housing 5 of convex shape, the flat surface of which occupies the major part, if not almost all of the surface of the composite strip 2. A piece 6 of a filtering film of a thermoplastic polarizing material is matched by flat cutting, then by thermoforming, to the convex shape and to the dimensions of the convex housing 5. The convexity of the housing 5 is identical to that of the outer face 2c of the matrix 4. This piece 6, after molding as described below, completely occupies the housing 5, virtually without space or interstice between the piece 6 and the matrix 4, that is subsequently perceptible to the eye of the user of the future lens. The angular orientation of the piece 6 of filtering film, in and with respect to the matrix 4 of transparent material, about the same normal axis passing through the matrix 4 and the piece 6, is chosen to give the blank, in a predetermined manner, a preferred plane of polarization 3, which will be discussed below.

The positioning of the piece 6 with respect to the matrix 4 is obtained by any suitable means, for example by simple fitting or assembly, or with hollow or relief indicators.

The piece 6 of the filtering film has a constant thickness, as shown in particular in FIGS. 3 and 4, while the matrix 4 has a thickness decreasing from the optical axis toward the outside (FIG. 4).

The peripheral border 2a of the blank 1 comprises two truncated circular edges 2a1 and 2a2, which are concentric about a geometric center or gravity center 10, and separated by two straight parallel edges 2a3 and 2a4, for example of identical lengths. As shown by FIGS. 1 and 2, the perimeter 5a of the flat housing 5 has substantially the same profile as that of the peripheral border 2a of the strip 2, and is fitted in a homothetic manner therein.

The piece 6 of filtering film is cut and thermoformed in the latter, such that the preferred plane of polarization of said film is substantially parallel or perpendicular to each parallel straight edge 5a3 or 5a4 of this piece, in view of which each parallel straight edge 2a3 or 2a4 of the blank it itself substantially parallel or perpendicular to the preferred plane of polarization 3 of the latter (cf. in particular FIG. 2).

In a manner known per se, and in particular with reference to document FR-2 740 231, the inner 2b and outer 2c faces of the composite strip 2 each have, at least in part, a symmetry of revolution about the same axis 7 identical to the optical axis of the blank 1, determining an optical center 8 on the outer 2b and inner 2c faces of the strip 2. It must be understood that the optical axis 7 does not necessarily pass through the blank 1, and may be located outside the latter. As shown in FIG. 2, the optical axis 7 is substantially parallel to the preferred plane of polarization 3 of the blank 1.

Still in a manner known by document FR2 740 231, the geometric shape of the outer face 2b and/or of the inner face 2c of the composite strip 2, are determined so that in a plane of horizontal section, as defined by reference to FIG. 3, itself substantially parallel to the preferred plane of polarization 3, the thickness of the composite strip 2 decreases continually on moving away from the optical axis 7, that is to say on going from the optical axis for example toward the outer left side of the temple of the user of the glasses.

Preferably, and as shown in FIG. 3, the geometric shape of the outer face 2b and the geometric shape of the inner face 2c are fitted respectively into two spheres with spaced-apart centers, the respective centers 81 and 9 of which are both located and offset one with respect to the other, on the optical axis 7. The radii R1 of the sphere corresponding to the outer face 2b, and R2 of the sphere corresponding to the inner face 2c, are different.

According to FIGS. 1 and 2, the result of the profile retained for the peripheral edge 2a of the blank 1, is that the latter has, at least in part, a profile of revolution about a geometric centre 10, which is placed at a distance and distinct from the optical axis 7 and from the optical center 8. Consequently, the optical axis 7 and the geometric centre 10 determine a plane substantially parallel to the preferred plane of polarization 3 of the blank, as shown in FIG. 2 in particular.

According to the above definition of the expression "substantially parallel or perpendicular", along the point in question on the blank, the preferred plane of polarization is in fact slightly secant or inclined (from 0° to 30°), with respect to the plane determined by the optical axis 7 and the geometric centre 10.

By way of second embodiment, and according to FIG. 9, the peripheral border 2a of the lens 1 is circular, and the perimeter 5a of the housing 5 of the piece 6 of filtering film comprises two truncated concentric circular edges 5a1 and 5a2, separated by two parallel straight edges 5a3 and 5a4, for example of identical lengths. The piece 6 of filtering film is cut in band shape in the polarizing film, such that the preferred plane of polarization 3 is substantially parallel or perpendicular to each straight edge of said piece, in view of which each straight line of separation between the matrix 4 of the transparent material and the piece 6 of filtering and colored material is substantially parallel or perpendicular to the preferred plane of polarization 3 of the blank.

The blank shown in FIG. 10 differs from that shown in FIG. 9, in that the peripheral border 2a comprises a predominantly circular part and a straight part 2a5, which is coincident with a straight edge 5a4 of the convex housing 5.

It must be understood that according to all the examples described above, the preferred plane of polarization 3 can be substantially, or [sic] parallel or perpendicular to the visual referential frame chosen and determined on the blank, for example the parallel straight edges 5a3 and 5a4 according to FIG. 9.

Using a blank as defined above, it is possible to obtain by trimming, for example, a left lens 13, in order to mount it in a pair of glasses 11, conventionally comprising a supporting frame 12 and the polarizing noncorrecting right lens 13 and left lens 14. The pair of glasses 11 may have a particularly enveloping shape, by closely following over its sides the curvature of the user's forehead, which then leads to lenses with a relatively low radius of curvature. As is shown in FIG. 6, starting from trimming and mounting, each lens 13 or 14 then comprises a composite strip 15 delimited between a convex outer face 15a and an opposite concave inner face 15b. This composite strip 15 consists of at least one transparent material 16, transmitting light from the outer face 15a to the inner face 15b. In addition, this composite strip 15 incorporates a filtering film 17 of polarizing material, determining for each lens at least one preferred plane of polarization 3 (cf. FIG. 5).

Each lens 13 or 14 comprises, from the inside toward the outside, on the one hand, a first thickness of transparent material 16, determining from the inner side the inner face 15b, and on the other hand, directly in contact with the first thickness, a second thickness of the filtering film 17, determining from the outer side said outer face 15a of the lens.

Figure 6:
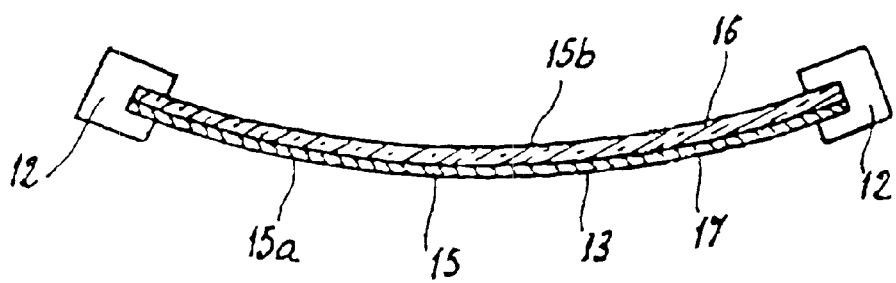
FIG. 6 shows a partial view in transverse section, along a horizontal plane as defined above, of the part of the glasses shown in FIG. 5, corresponding to the left lens.

As is shown in FIG. 5, each lens 13 or 14 is oriented at an angle with respect to the frame 12, about its optical axis 7 for example, such that its preferred plane of polarization 3 is substantially parallel or coincident with the horizontal plane of the pair of glasses, passing through the visual axis 18 of the glasses in position on the user's head.

The term "visual axis" refers to an axis lying in a horizontal plane passing through the two pupils of the user, in front of the head of the latter, and virtually without horizontal and/or vertical deviation from a point located at the center of the interpupillary separation.

As mentioned above for the blank 1, it must be understood that the preferred plane of polarization 3 of each lens 13 or 14 is substantially or [sic] parallel or perpendicular to the frame of reference chosen and predetermined on the pair of glasses 11, for example the horizontal plane passing through the visual axis 18.

Figure 7:
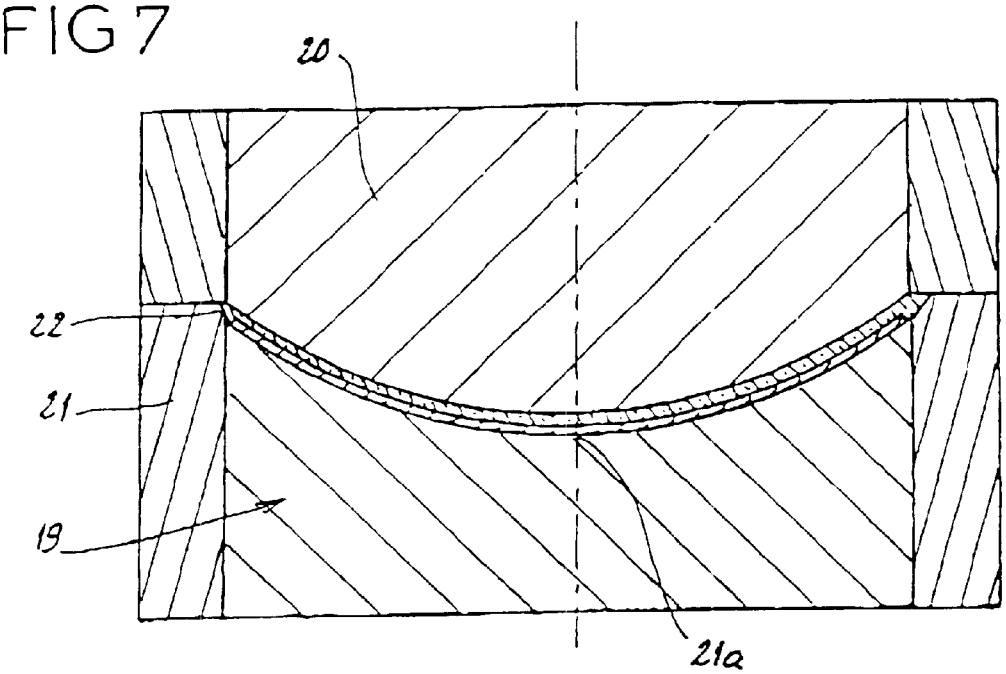
FIG. 7 shows, in transverse section, an injection mold for a transparent thermoplastic material, for example polycarbonate, making it possible to obtain a blank according to the representation of FIGS. 1 to 4.
Figure 8:
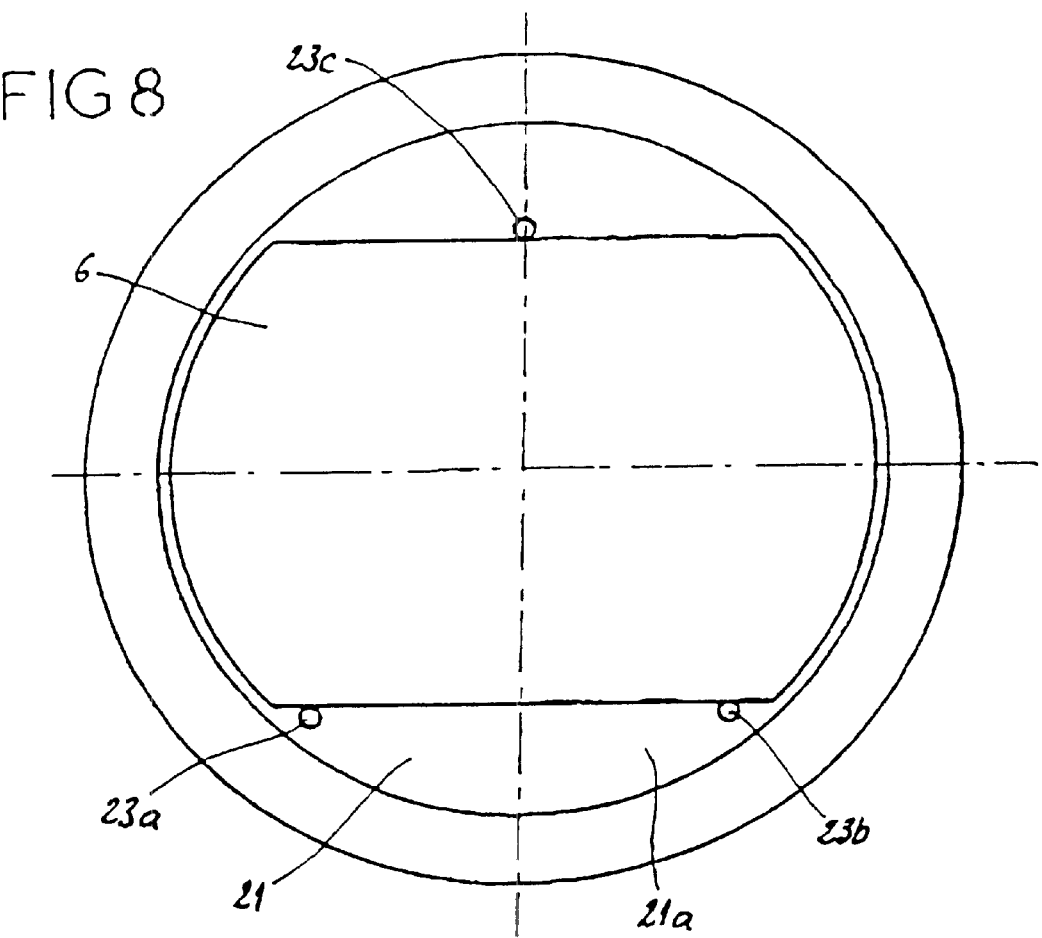
FIG. 8 shows, viewed end-on, a part of the mold shown in FIG. 7.

FIGS. 7 and 8 show a mold 19 for injecting transparent material, for example polycarbonate, in order to obtain a blank 1 as described above. This mold comprises two detachable parts 20 and 21 which are complementary to each other, determining, once assembled one on the other, a gap 22 whose volume and shape determine those of the strip 2.

According to the invention, the concave part of the mold 21 determining the outer face 2b of the blank 1 comprises flat means or studs 23a to 23c for positioning the convex piece 6 of filtering film.

The piece 6 can be cut flat, and not thermoformed. It is then placed and positioned as above in the concave part 21 of the mold, temporarily closely matching its shape. It takes a final convex shape on injection of the transparent material, for example polycarbonate.

According to one embodiment, the piece 6 of filtering film is cut flat then thermoformed, in order to have in its curved form the shape and the dimensions described with reference to FIGS. 1 to 4. This piece is then placed in the gap 22 of the mold in order to act as an insert, by being positioned using the studs 23a to 23c, in order to define, after injection of the transparent material into the gap 22, a predetermined orientation of the piece 6 with respect to the rest of the strip 2, giving the blank 1 a preferred plane of polarization, itself in an angular position determined with respect to the latter.

By virtue of the present invention, it is possible to trim each blank in a geometrically accurate manner with respect to its preferred plane of polarization, from which it follows that the lens thus obtained can be mounted in its turn in a geometrically accurate manner on the glasses frame, which overall makes it possible to position the preferred planes of polarization of the two lenses respectively, in a geometrically accurate manner with respect to the glasses, and in particular with a small angular distance between the preferred planes of polarization of the two lenses, respectively.

The description above shows how it is possible, by overmolding, to integrate in a lens the polarization function which is not accessible by injection molding.

The present invention also relates to other functions, for example, infrared filtration, which are difficult to access by injection molding. This is because the known pigments which have infrared filtration properties are sensitive to heat and deteriorate when they are subjected to the injection temperatures required by the processing of the injected polycarbonate (280 to 340° C.). The processing of these pigments in extruded polycarbonate makes it possible to form a sheet integrating these pigments without reaching the maximum operating temperatures which are about 200 to 250° C. This sheet can then be thermoformed in order to obtain the shape of the lens. During this thermoforming, the temperature in the sheet does not exceed 200° C. The thermoformed sheet can then be overmolded. It is of course also possible to directly overmold the sheet in a flat blank.

This process makes it possible to create an insert to be overmolded in a material other than polycarbonate and the processing of which requires low temperatures. The term "processing" also means obtaining an insert to be overmolded by an extrusion process, whether or not associated with thermoforming or even obtaining an insert by injection in a material injected at low temperatures. One condition to comply with is that the materials retained for the insert and the matrix, generally polycarbonate for the latter, have a compatibility which makes it possible to guarantee good adherence of one on the other after overmolding.

The process according to the invention also makes it possible to create an optical function in the region of the lens where the latter is used. Thus the photochromic function, which modifies the intensity of the lens color as a function of the received light intensity, can be obtained by incorporation of photochromic pigments in the injected material. These pigments are sensitive to heat and lose a lot of their efficiency when they are injected at the temperature of the polycarbonate. In addition, the quantity of pigments needed in order to properly achieve this function is so large that it substantially affects (negatively) the mechanical strength properties of the finished product to such an extent that there is no further benefit in choosing polycarbonate as the base material. Finally, the effective proportion of pigments is very small since only the pigments present on the outer surface of the piece are activated. The overmolding process is then totally adapted for this photochromic function.

Other functions again can be obtained by the process according to the invention: obtaining coloration, a hard surface layer, specific filtration (laser, infrared, shade, etc.), obtaining an antifog layer, etc.

Depending on the function which it is desired to obtain, the housing designed to receive the composite strip integrating this function can be made on the convex face, as described above, or on the concave face of the blank.

A blank according to the invention can also be produced by another process than the overmolding process described by way of nonlimiting example above. Thus, a blank according to the invention can be obtained also by adhesive bonding, by two-shot injection molding or by any other process.

The overmolding process described above, or even adhesive bonding, allow the use of substantially different materials for the composite strip and for the matrix. These processes make it possible, for example, to employ cellulose acetobutyrate which is beneficial to use with regard to heat-related stresses.

What is claimed is:

1. A process for manufacturing a noncorrecting lens blank (1) integrating an optical function, having inner (2c) and outer (2b) faces which are respectively concave and convex, delimited by a peripheral border (2a), and comprising a matrix (4) made of transparent material, transmitting light from the outer face toward the inner face, and an insert (6) integrating the optical function, comprising:

manufacturing the matrix (4) while at the same time making a housing (5) in one of the faces (2b, 2c) of the matrix (4), and fitting the insert (6) into the housing (5).

2. The process for manufacturing a blank according to claim 1, wherein the housing (5) is sized to occupy the majority of the surface of the face (2b, 2c) of the matrix in which the housing is made.

3. The process for manufacturing a blank according to claim 1, wherein the steps of making the housing (5) forms a bottom of the housing with a curvature substantially identical to that of the face (2b, 2c) in which the housing is produced.

4. The process for manufacturing a blank according to claim 1, wherein the housing (5) is made with a substantially constant depth.

5. The process for manufacturing a blank according to claim 1, wherein:

the step of manufacturing the matrix (4) forms the peripheral border (2a) from two truncated concentric circular edges (2a1) and (2a2), separated by two straight parallel edges (2a3, 2a4), and the step of making the housing makes a perimeter (5a) of the housing (5) with substantially the same profile as that of the peripheral border (2a), and is fitted in a homothetic manner into the latter.

6. The process of manufacturing a blank according to claim 1, wherein:

the step of manufacturing the matrix (4) forms the peripheral border (2a) predominantly circular, and the step of making the housing makes a perimeter (5a) of the housing (5) with two truncated concentric circular edges (5a1, 5a2), separated by two straight parallel edges (5a3, 5a4).

7. The process for manufacturing a blank according to claim 6, wherein:

the step of manufacturing the matrix (4) forms the peripheral border (2a) from a predominant circular part and a straight part (2a5), and the step of making the housing (5) makes one of the straight edges (5a4) coincident with the straight part of the matrix.

8. The process of manufacturing a blank according to claim 1, further comprising covering the outer face (2b) of the blank with at least one layer of a material chosen from the group comprising scratch-resistant materials, filtering materials and colored materials.

9. The process for manufacturing a blank according to claim 1, wherein in producing the matrix (4) and the housing (5) and the insert (6), the inner (2b) and outer (2c) faces of the blank (1) each have, at least in part, a symmetry of revolution about a same optical axis (7) determining an optical center (8) on the outer (2b) and inner (2c) faces of the blank (1).

10. The process for manufacturing a blank according to claim 9, wherein in producing the matrix (4) and the housing (5) and the insert (6), the geometric shape of the outer face (2b) and the geometric shape of the inner face (2c) are defined by two spheres of centers (8, 9) spaced out along the optical axis (7).

11. The process for manufacturing a blank according to claim 9, wherein in producing the matrix (4), the peripheral border (2a) has at least in part a profile of revolution about a geometric center (10), placed at some distance and distinct from the optical axis (7).

12. The process for manufacturing a blank according to claim 11, further comprising:

producing the insert (6) in a polarizing material having a preferred plane of polarization, and making the housing (5) and fitting the insert (6) into the housing (5) of the matrix so that the plane of polarization is substantially perpendicular or parallel to a plane defined by the optical axis (7) and the geometric center (10).

13. The process for manufacturing a blank according to claim 9, further comprising:

producing the insert (6) in a polarizing material having a preferred plane of polarization, and making the housing (5) and fitting the insert (6) into the housing (5) of the matrix so that the plane of polarization is substantially parallel to the optical axis (7) of the blank.

14. The process for manufacturing a blank according to claim 12, wherein in a plane of section substantially parallel or perpendicular to the preferred plane of polarization, a thickness of the blank decreases continually when moving away from the optical axis (7) toward the outside.

15. The process for manufacturing a blank according to claim 1, further comprising:

producing the insert (6) in a polarizing material having a preferred plane of polarization, and producing the housing (5) and fitting the insert (6) into the housing (5) of the matrix so that the plane of polarization is substantially parallel to a transverse plane (3) of the blank (1) thus obtained.

16. The process for manufacturing a blank according to claim 15, further comprising:

making the housing (5) with a perimeter (5a) including two truncated concentric circular edges (5a1, 5a2), separated by two straight parallel edges (5a3, 5a4), and cutting the insert (6) in the polarizing material such that the insert (6) has a shape complementary to that of the housing and comprises two truncated circular and concentric edges, separated by two straight parallel edges (5a3, 5a4), in which a preferred plane of polarization is substantially parallel or perpendicular to the straight parallel edges of the insert.

17. The process for manufacturing a blank according to claim 1, further comprising overmolding the insert (6) in the housing (5).

18. The process for manufacturing a blank according to claim 1, further comprising adhesively bonding the insert (6) into the housing (5).

19. A noncorrecting lens blank integrating an optical function, having inner (2c) and outer (2b) faces, which are respectively concave and convex, delimited by a peripheral border (2a), and comprising a matrix (4) made of transparent material, transmitting light from the outer face toward the inner face, and an insert (6) integrating the optical function, manufactured in compliance with the process according to claim 1.

20. A noncorrecting lens blank integrating an optical function, having inner (2c) and outer (2b) faces, which are respectively concave and convex, delimited by a peripheral border (2a), and comprising a matrix (4) made of transparent material, transmitting light from the outer face toward the inner face, and an insert (6) integrating the optical function placed in one of the faces of the matrix, wherein the insert (6) has two truncated concentric circular edges (5a1, 5a2), separated by two straight parallel edges (5a3, 5a4).

21. The noncorrecting lens blank according to claim 20, wherein the peripheral border (2a) comprises two truncated concentric circular edges (2a1, 2a2), separated by two straight parallel edges (2a3, 2a4).

22. The noncorrecting lens blank according to claim 21, wherein a straight edge of the insert (6) is coincident with a straight edge of the peripheral border.

23. The noncorrecting lens blank according to claim 20, wherein the peripheral border (2a) comprises a predominant circular part and a straight part (2a5).

24. The noncorrecting lens blank according to claim 20, wherein the insert (6) integrates a polarization function and has a preferred plane of polarization perpendicular or parallel to the straight edges of the insert (6).

25. A pair of glasses (11) comprising a frame (12) and two noncorrecting lenses (13, 14) integrating an optical function and being supported by said frame, characterized in that each lens is manufactured from a blank according to claim 19.

* * * * *